United States Patent

Baer

[15] 3,642,106
[45] Feb. 15, 1972

[54] SOFT START CLUTCH
[72] Inventor: John S. Baer, Medford Lakes, N.J.
[73] Assignee: Warner Electric Brake & Clutch Company, South Beloit, Ill.
[22] Filed: July 22, 1970
[21] Appl. No.: 57,172

[52] U.S. Cl. .................................. 192/70, 192/26, 192/84 C
[51] Int. Cl. ........................................ F16d 13/32, F16d 27/10
[58] Field of Search ........................... 192/26, 84 C, 84 T, 70

[56] References Cited

UNITED STATES PATENTS

| R25,229 | 8/1962 | Sacchini et al. | 192/26 X |
|---|---|---|---|
| 3,149,705 | 9/1964 | Shoquist | 192/84 C X |
| 3,149,706 | 9/1964 | Mason et al. | 192/84 C X |
| 3,177,996 | 4/1965 | Bates | 192/84 T X |

Primary Examiner—Allan D. Herrmann
Attorney—Wolfe, Hubbard, Leydig, Voit & Osann, Ltd.

[57] ABSTRACT

A clutch provides two pairs of friction faces between rotatable input and output hubs. One of said hubs provides a coaxial cylindrical surface for support of the other hub and a neutral hub between a pair of radially outwardly extending shoulders providing its friction faces. The other hub, and the neutral hub are rotatably supported on the cylindrical surface between the shoulders with spring means associated with one of the friction faces urging the hubs together and the friction faces into contact with one another. A ring which is wedge shaped in radial cross sections and capable of being pressed inwardly lies preferably in a wedge shaped groove between said other hub and neutral hub. A helical spring surrounds the outer face of the ring and when wrapped down urges the ring inwardly to urge the block and hub apart and their respective clutch faces into the opposed clutch faces of the other hubs with sufficient force to permit transmission of torque.

22 Claims, 7 Drawing Figures

INVENTOR:
JOHN S. BAER
BY
Howson & Howson
ATTYS

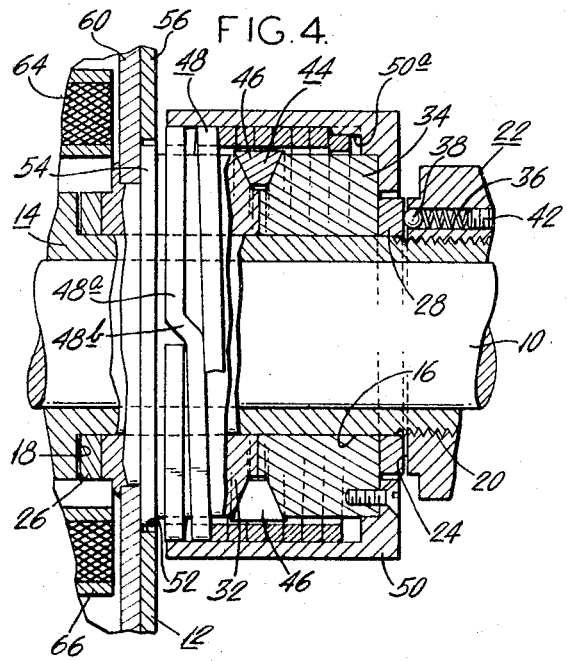

SOFT START CLUTCH

This invention relates to a clutch which although a friction face clutch is capable of soft starts. More specifically, it relates to a clutch which has a helical spring actuator acting on a ring-shaped wedge between a pair of rotatable hubs each of which carries clutch faces. The ring wedge segments when squeezed inwardly force the hubs apart to cause them to engage respective ones of a pair of opposed clutch faces on the other hub with sufficient force to permit the transfer of torque between the faces.

By use of light spring pressure, which presets the friction surfaces into slight engagement, there is developed a tendency to resist turning on the part of the nondriven output hub, and this, in turn, will tend to cause the helical spring to wrap down tighter, which will cause the resistance to increase, etc.

More specifically, in accordance with the present invention, rotatable input and output hubs are provided wherein one of those hubs provides a cylindrical bearing surface for the other extending between a pair of opposed shoulders providing opposed friction clutch surfaces. The other hub and a neutral hub are rotatably supported together on the one hub between the shoulders and friction faces opposing those of the one hub. Very little clearance is provided between the hubs and spring urging at one of the friction faces of said one hub preferably keep all hubs and friction faces in contact. Between the hub and the neutral hub is a ring wedge which when pressed at its outer surface the friction clutch surfaces into torque-transmitting engagement.

In accordance with the present invention the clutch may be a normally engaged type which employs a spring which is normally wrapped down so that release of the spring will disengage the ring wedge and the clutch. On the other hand, it is also possible to provide a normally disengaged clutch having a helical spring which is normally out of engagement with the ring wedge and which causes engagement when wrapped down on the ring wedge.

For a better understanding of the present invention, reference is made to the accompanying drawings in which, FIG. 1 is an end view of a preferred embodiment of normally disengaged clutch;

FIG. 4 is a partial sectional view similar to FIG. 2 showing the clutch in its normally disengaged condition;

FIG. 5 is a sectional view taken along line 5—5 of FIG. 2;

FIG. 6 is an axial sectional view of a modified clutch in accordance with the present invention, which is normally engaged;

FIG. 7 is a sectional view taken along line 7—7 of the clutch of FIG. 6.

Figure 1:
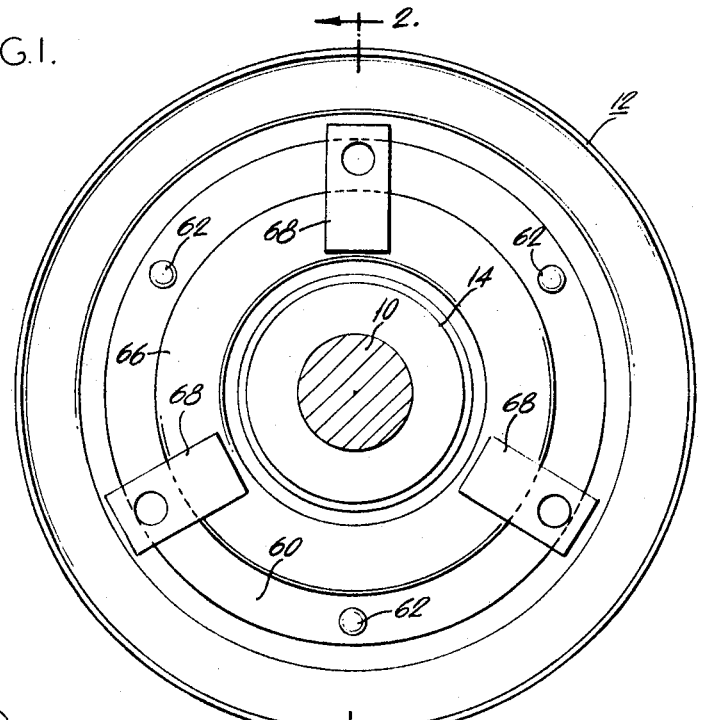
Figure 2:
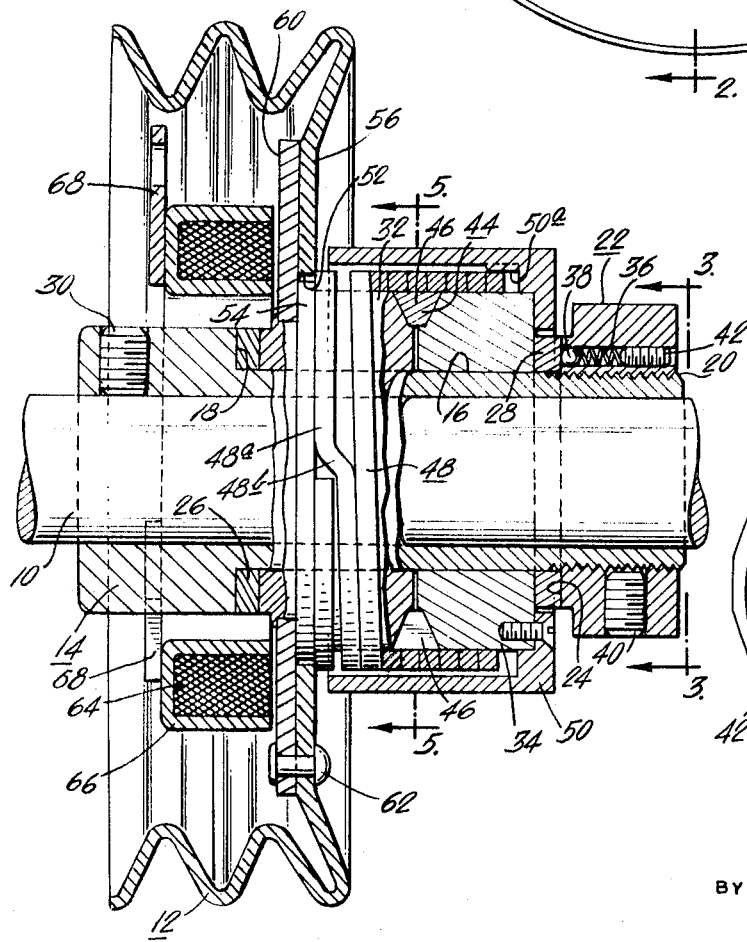
FIG. 2 is a sectional view taken along line 2—2 of FIG. 1 showing the clutch in engaged condition.

Considering first the clutch of FIGS. 1—5, reference is particularly drawn to FIG. 2. In this particular clutch the output is taken along the shaft 10, whereas the input is applied to pulley 12 by a belt, such as an automobile fan belt, but it will be understood that within the scope of the invention the inputs and outputs could easily be reversed. In this particular embodiment, the output hub 14 is a tubular structure having a uniform inner diameter, but having portions of different outer diameter. The output hub 14 is connected to the shaft 10 by setscrews 30, or other appropriate means. The intermediate section of the output hub has a smooth cylindrical outer surface 16 intended to serve as a bearing for the input and neutral hubs and terminated at one end by an enlarged diameter portion which provides a shoulder 18 which serves a function which will be later explained. Its other end 20 is threaded to receive a nut-like member 22 which provides a shoulder or face 24 which is opposed to and spaced from shoulder 18. Effectively then, the output hub has a bearing surface 16 between opposed shoulders 18 and 24. The shoulders in some other embodiment might themselves serve as the planar friction clutch surfaces, but in this particular embodiment they do not. Rather, shoulder 18 is faced with an annular friction disc 26 and shoulder 24, a similar friction disc 28, which provides the actual friction faces.

Figure 3:
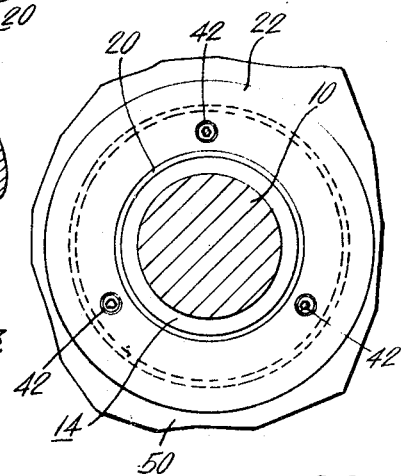
FIG. 3 is a sectional view taken along line 3—3 of FIG. 2.

Between the shoulders 18 and 24 and their associated friction members 26 and 28, are located a pair of hubs 32 and 34. In this particular case the hub 32 is the driven input hub. These hubs have little lateral clearance but are laterally slidable on cylindrical surface 16 between the friction members 26 and 28. Furthermore, the hubs 32 and 34 and friction members 26 and 28 are urged together laterally by springs which in this case are located in three bores parallel to the axis spaced around shoulder 24 of nut 22. The spring means in this case are helical springs which bear against balls 38 which actually apply the axial pressure to the friction ring 28. The lateral clearances in the hubs 32 and 34 and frictional members 26 and 28 have to be less than the diameter of the ball 38 to prevent loss of the balls. Adjustment of clearances is accomplished by adjustment of the position of nut 22 on the threaded portion 20 of output hub 16. When the position of nut 22 is finally selected a setscrew 40 fixes the nut in position. Adjustment of the force applied by spring means 36 can be achieved through adjustment screws 42, one of which is provided in connection with each of the three springs 36, as seen in FIG. 3. Other means of maintaining pressure on the input and neutral hubs may be substituted between the nut 22 and friction washer 28, or elsewhere, to achieve the same result as the spring arrangement shown. Some of the possible substitutes, for example, are corrugated Bellville washers, wave washers.

The hubs 32 and 34 are cut away between the two hubs to provide a wedge-shaped groove to receive a ring wedge 44. As best seen in FIG. 5, ring wedge 44 is preferably composed of three identical segments 46, which are slightly spaced apart at their ends to permit radially inward movement of the wedge segments 46. While it is not preferred a highly resilient one-piece structure might serve the purpose in some applications. Ordinarily, however, the wedge ring is divided into three or more segments. The ring wedge segments as they are moved radially inwardly serve to spread the hubs 32 and 34 further apart and thereby supply sufficient lateral force at the friction clutch faces to transmit torque from the input to output hubs. The faces of the input and neutral hubs adjacent the friction rings 26 and 28, respectively, serve as the friction clutch faces for those elements.

Radially inward force to move the ring wedge segments 46 to actuate the clutch is provided by the spring 48. Spring 48 is normally out of engagement with the outer periphery of the wedge segments, as shown in FIG. 4. Spring 48 is fixed to the neutral hub 34 by a press fit under inwardly projecting ridge 50a within tubular cover 50 which, in turn, is fixed to he neutral hub. Cover 50 is spaced from and surrounds those areas of input and neutral hubs 32 and 34 covered by spring 48 and serves to prevent the outward expansion of spring 48 to its completely relaxed position, thereby keeping the spring more stable and under greater control. Spring 48 is a right-hand helically wound spring, but the last turn remote from the turn affixed to hub 34 by ridge 50a is a flat turn 48a, which lies generally in a plane parallel to the axis. Conversion from the helical to flat turn is accomplished by an offset 48b in the spring. The spring is composed of spring steel or other selected magnetic material and is close spaced to a reluctance gap 52 at the general radius spring. The reluctance gap is part of the magnetic circuit including radially extending flange 54 and web 56 formed of sheet steel or other magnetic material integrally as a part of the fan belt pulley 58. Staked to the hub 32 is a planar sheetmetal aluminum ring 60 which, in turn, is rivited by rivets 62 to the web 56 to support the pulley and in the process create the airgap 52. The magnetic field is created by a winding 64, which is supported from the nonrotating frame in an annular channel 66 by brackets 68, as seen in FIG. 1. The magnetic circuit of channel 66 is continued through web 56 and flange 54 across airgap 52. Energizing the winding 64 creates a magnetic field which draws the turn 48a into the airgap 52 and tends to hold it in place against the flange 54 as hub 32 rotates. As turn 48a rotates with the input hub it wraps spring 48 down from the position shown in FIG. 4 to the position shown in FIG. 2. In the course of this action the segments 46 of the ring wedge 44 are forced radially inwardly between the hubs 32 and 34 wedging them apart, as the consequence of which these hubs are displaced and placed under lateral pressure until the opposed friction faces effectively become one and are capable of transmitting torque. Interestingly, engagement occurs gradually, or more accurately smoothly, because of the effect provided by the pressure of springs 36 which maintain through the friction faces some slight resistance initially against the hubs turning, thereby causing the spring 48 to tend to wrap down tighter on hubs 32 and 34. The effect is cumulative; as more resistance to rotating is experienced, the spring 44 tends to wrap more tightly until the drive is completely positive. Clutch engagement will be smooth and produce soft starting rather than a sudden grab.

Referring now to FIGS. 6 and 7, a structure is shown which in many respects is similar to that of FIGS. 1–5. In this particular case output shaft 78 is press fitted into tubular output hub 80, which in this case has a pair of adjustable nut elements 82 and 84, both of which are held in final selected position by a setscrew. A wedge shaped groove into which ring wedge 90 fits is provided between an input hub 86 and a neutral hub 88. In this case ring wedge 90 is normally held in its inwardly urged position by spring 92 whose resilience holds it normally closed and wrapped down. In this particular case the spring is fixed at one end to neutral hub 88 by tang 92a and at the other end to a nylon collar 94 by tang 92b. In this case the spring action ordinarily holds the wedge in place to urge the hubs 86 and 88 apart and into the friction members 96 and 98, so that the clutch is engaged and the input and output hubs rotate as a unit. However, by moving a pawl 100 into the path of a stop 102 on the nylon collar 94, the attached end of spring 92 through tang 92b is stopped and as tang 92a continues to rotate will open up. The force is thus removed from the wedge segments 90 allowing pressure to be removed from the friction members 96 and 98, and disengaging the clutch; thereupon the input hub 86 continues to rotate as it is driven, but the output hub is held stationary through the spring 92 by the stop 100 which tends to unwind the spring 92 as rotation continues. Once the stop 100 is withdrawn from the shoulder 102, however, the spring 92 due to its internal resilience again wraps down on the wedge 90 spreading hubs 86 and 88 apart and forcing them into the friction members 96 and 98 with sufficient force to transmit torque from the input to the output. In this case a wave washer 104 has been substituted for the spring means 36 of FIG. 2 and functions in the same way but without the flexibility in pressure adjustment. However it provides for a soft start as in the FIGS. 1–5 embodiment.

Two variations of the present invention have been described, and it will be understood that these embodiments are merely representative of variations which are possible within the scope of the invention. Further modifications are possible, including variations of the structure shown and entirely modified embodiments. All such modifications within the scope of the claims are intended to be within the scope and spirit of the present invention.

I claim:
1. A friction clutch comprising
 a rotatable input hub having a friction clutch face,
 an output hub rotatable about the same axis of rotation as the input hub,
 a pair of hubs rotatable about the input hub axis of rotation and relatively movable with respect to one another generally parallel to said axis of rotation, one of which has a generally cylindrical outer face and at least one of which is a neutral hub, neither input nor output,
 a ring wedge composed of a ring having radial cross sections in the form of an inwardly directed wedge, and an outer surface slightly larger than the cylindrical outer face of said at least one of said pair of hubs and located between said pair of hubs whereby pressure on the outer surface of the ring wedge will axially displace said pair of hubs relative to one another, and cause its friction clutch faces to engage, and
 a helical spring surrounding said ring wedge, said helical spring being attached at one end to one of said pair of hubs,
 said spring when wound down being operable to wrap down on the ring wedge, thereby exerting the pressure on the ring wedge to urge said hubs apart and the clutch faces into engagement.

2. The friction clutch of claim 1 in which the ring wedge is divided into a plurality of segments.

3. The friction clutch of claim 2 in which the ring wedge is divided into three wedge segments.

4. The friction clutch of claim 1 in which the input hub is one of the pair of hubs.

5. The friction clutch of claim 4 in which the one end of the helical clutch is fixed to the neutral hub and normally out of engagement with the ring wedge and input hub.

6. The friction clutch of claim 5 in which the spring is composed of magnetic material and in which magnetic actuation means is employed to act upon the other end of the helical spring to cause it to wrap down into engagement with the ring wedge.

7. The friction clutch of claim 6 in which the magnetic actuator means is employed to cause the free end of the helical spring to be magnetically drawn to and along with the input hub, thereby wrapping down the helical spring on the ring wedge.

8. The friction clutch of claim 7 in which the magnetic means includes flux-generating winding and a magnetic circuit including a portion of the input hub, which includes an annular reluctance gap into which the last turn of the helical winding is drawn.

9. The friction clutch of claim 1 in which one of the input and output hubs consists of a body having a cylindrical support surface on which the pair of hubs is rotatably and slidably supported between a pair of opposed outwardly extending radial shoulders on the output hub providing friction clutch faces against which opposed faces on each of the pair of hubs are forced by the wedging action of the ring wedge.

10. The friction clutch of claim 9 in which the output hub is the hub consisting of the tubular support and the input hub is one of the pair of hubs.

11. The friction clutch of claim 1 in which at least one of the friction clutch faces is a separate piece separated from and urged away from its supporting structure by resilient means urging it laterally and tending to hold friction clutch surfaces into contact with one another at all times.

12. The friction clutch of claim 9 in which at lest one of the friction clutch faces is a separate piece separated from and urged away from its supporting structure by resilient means urging it laterally and tending to hold friction clutch surfaces into contact with one another at all times.

13. The friction clutch of claim 1 in which the helical spring is normally out of engagement by virtue of its internal resilience and is drawn into engagement by the means selectively acting on the other end.

14. The friction clutch of claim 1 in which the pair of hubs includes the input hub and in which the helical spring is normally in engagement by virtue of its internal resilience and has one end attached to the neutral hub and its other end attached to a collar bearing a stop shoulder which rotates with the engaged clutch, so that a stop interposed in the path of the shoulder will stop the collar and disengage the clutch.

15. A friction clutch comprising
 an output hub consisting of a body having a coaxial cylindrical surface and a pair of opposed outwardly extending radial shoulders providing friction clutch faces,
 an input hub rotatably supported on the cylindrical surface of the output hub between said shoulders and having a clutch face opposing one of said shoulders,
 a neutral hub positioned adjacent the input hub rotatably supported on the cylindrical surface of the output hub and bearing a clutch face opposing the other shoulder of the output hub, a ring wedge positioned between the input hub and the neutral hub and having a radial cross section in the form of an inwardly directed wedge, a helical spring surrounding, but normally out of engagement with said ring wedge, and means causing said spring to wrap down on said ring wedge to force the input and neutral hubs apart and their clutch faces into engagement with the friction clutch faces of the output hub.

16. The friction clutch of claim 15 in which at least one of the friction clutch faces is a separate piece separated from and urged away from its supporting structure by resilient means urging it laterally and tending to hold friction clutch surfaces into contact with one another at all times.

17. The friction clutch of claim 16 in which the resilient means urging the separate piece is a plurality of springs together with pressure elements distributed around the periphery of the face in recesses normal to the face.

18. The friction clutch of claim 17 in which the helical spring is attached to one end to said neutral hub and is arranged to be engaged by the input hub to cause the clutch to become engaged.

19. The friction clutch of claim 18 in which the helical spring is composed of magnetic material and is wrapped down on the ring wedge by magnetic means providing means for attracting the free end of the spring to the input hub.

20. The friction clutch of claim 19 in which the magnetic means includes magnetic circuit a portion of which is included in the input hub and includes a reluctance gap into which the last turn of the spring is drawn when the winding is energized.

21. The friction clutch of claim 15 in which at least one of the output hub clutch surfaces is movable relative to the output hub in the axial direction and spring means is provided to urge said friction surface into contact with its opposed friction surface at all times.

22. The friction clutch of claim 21 in which said one of the output hub clutch surfaces is a ring subjected to spring pressure through a plurality of balls spring urged at a plurality of points around the circumference of said ring.

* * * * *